TIME CONTROL ARRANGEMENT FOR PHOTOGRAPHIC CAMERAS
Filed Sept. 26, 1967
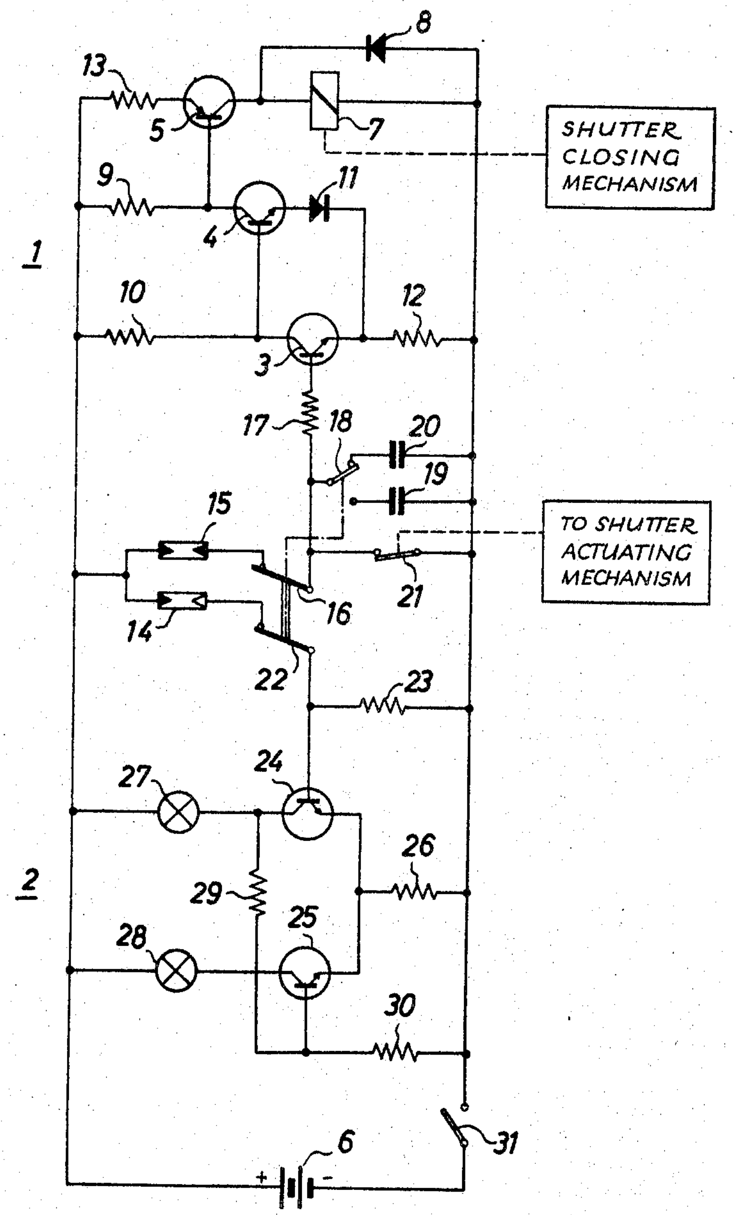
INVENTOR:
GERD KIPER
BY Michael S. Striker
Attorney United States Patent Office 3,487,757
Patented Jan. 6, 1970

3,487,757
TIME CONTROL ARRANGEMENT FOR PHOTOGRAPHIC CAMERAS

Gerd Kiper, Unterhaching, Germany, assignor to Agfa-Gevaert Aktiengesellschaft, Leverkusen, Germany
Filed Sept. 26, 1967, Ser. No. 670,625
Claims priority, application Germany, Sept. 30, 1966, A 53,633
Int. Cl. G01j *1/00, 1/52;* G03b *9/00*
U.S. Cl. 95—10 10 Claims

ABSTRACT OF THE DISCLOSURE

A photoelectric arrangement for controlling camera shutters. The timing circuit used to provide a signal for controlling the exposure time in dependence on the prevailing light conditions, is subdivided into two sections. One section of the timing circuit becomes operative when higher light intensity conditions prevail. The other section of the timing circuit corresponds to the conditions when relatively low light intensity for exposure purposes prevails. The timing function of each section of the timing circuit is established in conjunction with a photosensitive resistor connected in each section of the timing circuit. A transfer circuit connected to the photoelectric timing circuit transfers the operation of the latter to either the first section or the second section. Indicating lamps are provided to inform the user which one of the sections are operative. For the purpose of conserving photosensitive elements, the photoresistor associated with the second section of the timing circuit is connected to the indicating lamps when the first section is operative. The transfer of the photoresistor to the indicating lamps when the first section is operative. The transfer of the photoresistor to the indicating lamp from its designated timing function, is accomplished through a switching arrangement. The magnitude of the time interval provided by the timing circuit is established by an RC network arrangement associated with either section 1 or section 2 of the timing circuit.

BACKGROUND OF THE INVENTION

The present invention relates to a photographic shutter which is controlled by a photoelectric timing circuit. The timing circuit is composed of two parts. One part of the timing circuit corresponds to a region of higher prevailing light intensity for the exposures, whereas the second part of the timing circuit corresponds to lower light intensity regions. The timing circuit operates in conjunction with a switching arrangement which switches the timing circuit from one part to the other part depending on the prevailing brightness or light intensity. A photoelectrically controlled arrangement is further provided to indicate the region to which the prevailing light intensity corresponds, or for the purpose of controlling the switching circuit for transferring the timing circuit from one part or state to the other part or state.

Photographic cameras of the preceding species require separate photoresistors for every part of the timing circuit and the indicating circuitry. Since the photoresistors are required to possess highly accurate operating and response characteristics, the situation becomes relatively complex. For this reason, a shutter control arrangement is known in the art in which the indicating circuitry and the automatic exposure arrangement is provided with only one photoresistor. The photoresistor, in this design, is selectively set to either the indicating function or the shutter function. If the transfer from one function to the other takes place while the shutter is being released, then the release mechanism is required to possess a relatively long release path. When a separate manual switching lever or similar manually operated switching mechanism is used, the signal for the prevailing brightness at the beginning of the taking of an exposure, is no longer visible.

In order to overcome the preceding disadvantages and to achieve the desired results with the minimum number of elements possible, particularly with regard to the number of photoresistors, the present invention provides a photoresistor for the first part of the timing circuit and a second photoresistor for the second part of the timing circuit. The switching or transfer circuitry associated with the timing circuit and parts thereof, include furthermore, in accordance with the present invention, switching means for connecting the second photoresistor to the indicating arrangement while the first part of the timing circuit is in operation.

In accordance with the design of the present invention, the camera requires only two photoresistors. In this arrangement, the indicating signal is at least visible in the region corresponding to the higher light intensities. As a result of this arrangement of the present invention, no auxiliary manual lever or manually operated mechanism is designated for the user of the camera. This arises from the design condition wherein the switching means associated with the second photoresistor is coupled to the switching or transfer arrangement which transfers the circuitry from one light intensity region to the other.

SUMMARY OF THE INVENTION

A photographic camera having its shutter controlled through a photoelectric timing circuit. The latter is subdivided into two circuit portions or sections. One section corresponds to prevailing light conditions in which higher exposure brightness or high light intensities are present. The second section of the photoelectric timing circuit becomes operative when lower exposure brightness conditions prevail. A transistor transfer circuit switches or transfers the operating state of the photoelectric timing circuit, from one section to the other. Each section of the timing circuit is provided with a photosensitive resistor. The photosensitive resistors function in conjunction with capacitors to provide the RC network essential in the timing circuit. The RC network determines the time interval or the timing function of the photoelectric timing circuit. Visual indicators are connected to the transfer circuit or switching circuit for the purpose of displaying which one of the circuit sections in the photoelectric timing circuit is operative. Switching contacts are included in the circuitry to connect the photosensitive resistor associated with the second circuit section of the photoelectric timing circuit, with the visual indicating means when the first circuit section is in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An electric schematic diagram showing the operating elements of the photoelectric timing circuit, transfer circuit and indicating devices, and the manner in which they are interconnected, in accordance with the present invention.

DESCRIPTION OF THE PREFERRED EMBODIMENTS

The drawing, in accordance with the present invention, shows a circuit for controlling a so-called instrument or electronic shutter which is described, for example, in the German Patent 1,125,270 (FIGS. 2 and 3) or the German Patent 1,212,838 (FIG. 4). In principle, such electronic shutters may be replaced through the use of those having a photoelectric converter and a rotary coil instrument. In addition, such shutter are provided with two brightness or light intensity regions. For example, for a region corresponding to higher light intensity, the shutter is provided with a timing and diaphragm program. For the region of relatively low light intensity, on the other hand, a pure timing program is provided.

Referring to the drawing, the timing circuit for the purpose of controlling the shutter, is designated by the reference numeral 1. This circuit is located in the upper portion of the drawing. At the lower portion of the drawing, is the circuit for providing indications. This circuit arrangement is designated by the reference numeral 2. The timing circuit 1 is designed in the conventional manner through the use of three transistors 3, 4 and 5. The coil of an electromagnet 7 is connected between the collector of transistor 5 and the negative terminal of battery 6. A diode 8 is connected in parallel or across the electromagnet 7. The electromagnet 7 is used for controlling purposes as, for example, in controlling the closing function of the release lever 62 in the shutter shown in FIG. 2 of the German Patent 1,125,270. Such an electromagnet may be similarly used to control the state of the lever 69 in the shutter illustrated in FIG. 3 of this same German patent. In the shutter of this particular German patent, pure timing control is provided. The electromagnet 7 can also correspond to the electromagnet 80 in the shutter illustrated in FIG. 4 of the German Patent 1,212,838. This latter shutter is a so-called diaphragm shutter which is provided with a timing-diaphragm program corresponding to the prevailing brightness or light intensity.

The collectors of transistors 3 and 4 lead to the positive terminal of the battery 6, by way of the resistors 9 and 10, respectively. The transistors 3 and 4 are of the n-p-n type. The base of the transistor 4 is connected to the junction of resistor 10 and the collector of transistor 3. The emitters of transistors 3 and 4 are connected to each other by way of a diode 11. The emitter of transistor 3 leads to the negative terminal of the battery 6 by way of the resistor 12.

The emitter of the transistor 5 is connected to the positive terminal of battery 6, via the resistor 13. The transistor 5 is of the p-n-p type. The base of the transistor 5 is connected to the collector of transistor 4. This particular interconnection arrangement of the transistors 3, 4 and 5, results in a commonly-known switching circuit in which either the transistor 3 or the transistor 5 is conducting or turned on. In this switching circuit arrangement, the base of transistor 3 serves as the input, and the collector of the transistor 5 is the output. Two photoresistors 14 and 15 are joined together at one end and to the positive terminal of the battery 6. The free terminal of the photoresistor 15 is connected to the resistor 17, by way of the switching contact 16 of a switching arrangement. The resistor 17 is, in turn, connected to the base of transistor 3. Another switching contact, contact 18, is connected to the junction of switching contact 16 and resistor 17. The switching contact 18 may connect to either one of two parallel situated capacitors 19 and 20. These capacitors are joined together at one electrode and are also connected to the negative terminal of the battery 6. Connected in parallel with the switch contact 18 and one of the two capacitors 19 and 20 (depending on the state of the switching contact 18), is a switching contact 21. This switching contact 21 is closed in the non-operative or quiescent state of the circuit.

When the circuit is in the state shown in the drawing, of the present invention, the switching contact 16 connects the photoresistor 15 to the switching contact 18 and the capacitor 20. When the switching contacts 16 and 18 are in the state opposite to that shown in the drawing, the controlling RC network of the timing circuit 1, is formed through the photoresistor 14 and the other one of the two capacitors 19 and 20. Thus, the timing circuit 1 includes an RC network for the timing element.

Referring again to the state of the circuit as it is shown in the drawing, the photoresistor 14 is connected, through the switching contact 22, to a resistor 23. The latter is connected, in turn, to the negative terminal of the battery 6. The junction of the switching contact 22 tand the resistor 23 is connected to the base of the transistor 24. The two transistors 24 and 25 form the switching arrangement of the indicating circuit 2. The two transistors 24 and 25 are of the n-p-n type. The emitters of these two transistors are joined together and their junction is, in turn, connected to a resistor 26 leading to the negative terminal of the battery 6. Connected to the collectors of transistors 24 and 25, are indicating lamps 27 and 28, respectively. These indicating lamps show which one of the two transistors (24 and 25) is conducting or is turned on. The collector of the transistor 24 leads to the base of the transistor 25, by way of the resistor 29. The base of the transistor 25 is also connected to the negative terminal of the battery 6, via the resistor 30. A main circuit operating switch 31 is connected between the negative terminal of the battery 6 and the remaining elements of the circuitry shown in the drawing, which are fed by the battery.

A contact 22 is mechanically coupled to the switching contacts 16 and 18. This is shown in the drawing by the dash-dot lines. Accordingly, the three switching contacts move together to the opposite state from that shown in the drawing and reverse. The shorting contact 21 is mechanically coupled to the shutter function in the conventional manner, and is thereby open when the shutter begins to open. With the opening of the switching contact 21, through this arrangement, assurance is had that the capacitors 19 and 20 are fully discharged at the beginning of the illumination. The switching contact 18 may also be designed and arranged so that it can connect the capacitor 20 in parallel with the capacitor 19.

In operation, the switching contacts 16, 18 and 22 assume the state shown in the drawing, when the circuit is in the non-operative state and is set to the region corresponding to the higher light intensities. At the same time, the main operating switch 31 is open. The shorting contact 21 may be either in the open or closed position, depending upon the design of the shutter. It is only essential that it is closed a short interval immediately preceding the instant of exposure.

With the closure of the main operating switch 31 by, for example, the release button, the circuit becomes energized. The base of the transistor 24 acquires a potential determined by the voltage divider comprised of the photoresistor 14 and the resistor 23. This potential corresponds to the prevailing light intensity or brightness. When sufficient light prevails this base potential is above the potential of the emitter and as a result the transistor 24 becomes conducting. The transistor 25, on the other hand, becomes cut off due to the feedback circuit including resistor 29. The lamp 27 which may, for example, be of green color, will then light and indicate thereby that the prevailing brightness corresponds to the region of higher light intensity. At the same time, the photoresistor 15 is switched into the timing circuit. The photoresistor 15 may have characeristics differing from the photoresistor 14. If, under these conditions, an exposure is taken, the time interval until the electromagnet 7 becomes released, is determined by the photoresistor 15 and capacitor 20, connected to the former through the switching contact 18. With the release of the electromagnet 7, the closing mechanism of the shutter is released. The operational procedure of such a timing arrangement is well known in the art and requires, therefore, no further explanation.

If, now, the prevailing brightness or light intensity is lower than the critical value, the base potential of the transistor 24 drops below the limiting value at which the circuit transfers states or switches to the opposite state. The green lamp 27 becomes thereby extinguished and the lamp 28 which, for example, may be colored red, is turned on. The lamp 28 connected to the collector of the transistor 25 will, therefore, indicate that the transistor 25 is in the conducting state. The significance of these conditions is that with the arrangement, as shown in the drawing, it is not possible to attain satisfactory exposure control. This is due to the condition, for example, that the timing-diaphragm program through photoresistor 15 is insufficient. The switching contacts 16, 18 and 22 must then be brought into their other state or position through, for example, by manual means. However, this transfer of the switching contact may also be accomplished through photoelectrically controlled switching means. The photoresistor 14 in combination with the capacitor 19 then forms the RC network of the timing circuit. It is possible to establish the response characteristic of the RC network so that the timing circuit 1 controls a pure timing program. This may be accomplished by modifying the capacitance of the capacitor 19 or providing that the characteristics of the photoresistor 14 be of a different type. In this regard, it is also possible to apply compensating resistors, in the conventional manner, by connecting them in series or in parallel with the photoresistor. The arrangement may be designed so that while a pure timing program is controlled in one state or position, a timing-diaphragm program is executed in the other state of the circuitry. As a result of the opening of the switching contact 22, the base of the transistor 24 acquires a potential which represents an infinitely large resistance value with respect to the photoresistor 14. The indicating arrangement tool thus assumes the state in which the lamp 28 is turned on corresponding to the indication for the lower brightness or lower light intensity region.

The switching arrangement through the switching contacts 16, 18 and 22 is also of advantage, when pure timing control is executed for both brightness or light intensity regions. In this case, the first RC network composed of photoresistor 15 and capacitor 20, correspond to the region for very short exposure time. The second RC network, on the other hand, comprised of photoresistor 14 and capacitor 19, is designated for the region corresponding to the longer exposure times. In any event, the capacitor being used can be trimmed effectively to the desired value in order to achieve the required accuracy for the short and long time interval regions.

It will be understood that each of the elements described above, or two or more together, may also find a useful application in other types of timing circuits in photographic cameras differing from the types described above.

While the invention has been illustrated and described as embodied in timing circuits in photographic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for controlling a photographic shutter comprising, in combination, a photoelectric timing circuit having a first circuit section corresponding to higher exposure brightness conditions and having a second circuit section corresponding to lower exposure brightness conditions; first photosensitive resistor means connected in said first circuit section of said photoelectric timing circuit for determining a timing function when said first circuit section is operative; second photosensitive resistor means connected in said second circuit section of said photoelectric timing circuit for determining a timing function when said second circuit section is operative; a transfer circuit connected to said photoelectric timing circuit for transferring the operation of said timing circuit from one circuit section to the other; indicating means connected to said transfer circuit for indicating which one of said circuit sections in said timing circuit is in operation; and switching means for connecting said second photosensitive resistor means to said indicating means when said first circuit section of said photoelectric timing circuit is operative.

2. The arrangement for controlling a photographic shutter as defined in claim 1 wherein said shutter is a diaphragm shutter operating with a timing-diaphragm program when higher exposure brightness condition prevail.

3. The arrangement for controlling a photographic shutter as defined in claim 2 wherein said first photosensitive resistor means has a response characteristic steeper than that of said second photosensitive resistor means.

4. The arrangement for controlling a photographic shutter as defined in claim 1 wherein said photoelectric timing circuit includes at least two transistors for switching said timing circuit, the input of said timing circuit being connected to said first and second photosensitive resistor means.

5. The arrangement for controlling a photographic shutter as defined in claim 1 including capacitor means operating in conjunction with said photosensitive resistor means for providing a timing RC network in said photoelectric timing circuit.

6. The arrangement for controlling a photographic shutter as defined in claim 1, including electromagnetic means connected to said photoelectric timing circuit and being controlled by said photoelectric timing circuit.

7. The arrangement for controlling a photographic shutter as defined in claim 1, including first capacitor means and second capacitor means; and capacitor switching means for connecting at least one of said capacitor means to the input of said photoelectric timing circuit.

8. The arrangement for controlling a photographic shutter as defined in claim 1 wherein said indicating means includes at least two transistors; and at least two indicating lamps each connected to the emitter-collector path of one of said transistors, said indicating lamps being turned on when the transistor to which the indicating lamp is connected is in the conducting state.

9. The arrangement for controlling a photographic shutter as defined in claim 1 including battery means having positive and negative voltage terminals; and fixed resistor means connected between the input of said indicating means and said negative terminal of said battery means.

10. The arrangement for controlling a photographic shutter as defined in claim 1 wherein said indicating means comprises further two indicating lamps providing a visual indication when a voltage difference is applied across said lamps.

References Cited

UNITED STATES PATENTS

| | | |
|---|---|---|
| 3,205,803 | 9/1965 | Burgarella et al. |
| 3,397,629 | 8/1968 | Mori et al. |
| 3,418,479 | 12/1968 | Schmitt. |
| 3,433,140 | 3/1969 | Wick et al. |

NORTON ANSHER, Primary Examiner

J. F. PETERS, Jr., Assistant Examiner

U.S. Cl. X.R.

95—53; 250—208, 215; 356—224, 227